United States Patent
Tarandek et al.

(10) Patent No.: US 12,214,764 B2
(45) Date of Patent: Feb. 4, 2025

(54) BRAKE SYSTEM

(71) Applicant: HL MANDO CORPORATION, Gyeonggi-do (KR)

(72) Inventors: Kristijan Tarandek, Neu-Isenburg (DE); Hans Joerg Feigel, Rosbach (DE); I-Che Chiang, Frankfurt am Main (DE); Josko Kurbasa, Waldsolms (DE); Priti Kumari, Frankfurt am Main (DE)

(73) Assignee: HL MANDO CORPORATION, Gyeonggi-do (KR)

( * ) Notice: Subject to any disclaimer, the term of this patent is extended or adjusted under 35 U.S.C. 154(b) by 500 days.

(21) Appl. No.: 17/436,608

(22) PCT Filed: Mar. 6, 2020

(86) PCT No.: PCT/KR2020/003153
§ 371 (c)(1),
(2) Date: Sep. 5, 2021

(87) PCT Pub. No.: WO2020/180142
PCT Pub. Date: Sep. 10, 2020

(65) Prior Publication Data
US 2022/0153241 A1 May 19, 2022

(30) Foreign Application Priority Data
Mar. 6, 2019 (DE) .................. 10 2019 203 041.6

(51) Int. Cl.
*B60T 13/74* (2006.01)
*B60T 1/10* (2006.01)
(Continued)

(52) U.S. Cl.
CPC ................ *B60T 7/042* (2013.01); *B60T 1/10* (2013.01); *B60T 8/4081* (2013.01);
(Continued)

(58) Field of Classification Search
CPC .......... B60T 7/042; B60T 1/10; B60T 8/4081; B60T 13/662; B60T 13/667; B60T 13/686; B60T 13/745; B60T 2270/404
(Continued)

(56) References Cited

U.S. PATENT DOCUMENTS 9,738,263 B2 * 8/2017 Jung ...................... B60T 8/4081
10,703,347 B2 * 7/2020 Besier ..................... B60T 17/18
(Continued)

FOREIGN PATENT DOCUMENTS

DE  10 2009 046 234    5/2011
DE  10 2012 020 421    4/2014
(Continued)

OTHER PUBLICATIONS

International Search Report for PCT/KR2020/003153 mailed on Jun. 22, 2020 (now published as WO 2020/180142).
(Continued)

*Primary Examiner* — Christopher P Schwartz
(74) *Attorney, Agent, or Firm* — WOMBLE BOND DICKINSON (US) LLP

(57) ABSTRACT

Brake system (1) for a vehicle is provided, comprising a first hydraulic circuit (10) including a first wheel brake (11), a second hydraulic circuit (20) including a second wheel brake (21), a first hydraulic pressure supplier (12) including an actuator for pressurizing the first hydraulic circuit (10) in a normal operating mode, a second hydraulic pressure supplier (22) including an actuator for pressurizing the second hydraulic circuit (20) in the normal operating mode, a cut-off valve (30) hydraulically connecting the first and second hydraulic circuits (10, 20), a first control unit (14) for controlling the cut-off valve (30) and activating the first hydraulic pressure supplier (12) and the second hydraulic pressure supplier (22) depending on a brake request, and a
(Continued)

second control unit (24) for controlling the cut-off valve (30) and activating the first hydraulic pressure supplier (12) and the second hydraulic pressure supplier (22) depending on a brake request.

15 Claims, 3 Drawing Sheets

(51) Int. Cl.
  *B60T 7/04* (2006.01)
  *B60T 8/40* (2006.01)
  *B60T 13/66* (2006.01)
  *B60T 13/68* (2006.01)
(52) U.S. Cl.
  CPC .......... *B60T 13/662* (2013.01); *B60T 13/667* (2013.01); *B60T 13/686* (2013.01); *B60T 13/745* (2013.01); *B60T 2270/404* (2013.01)
(58) Field of Classification Search
  USPC ...................................................... 303/114.1
  See application file for complete search history.

(56) References Cited

U.S. PATENT DOCUMENTS

| | | | |
|---|---|---|---|
| 2004/0140712 A1 | 7/2004 | Matsumoto | |
| 2011/0168502 A1* | 7/2011 | Linhoff | B60T 13/588 303/3 |
| 2016/0347298 A1 | 12/2016 | Jung | |
| 2018/0148023 A1* | 5/2018 | Mannherz | B60T 17/22 |
| 2019/0031165 A1* | 1/2019 | Besier | B60T 8/348 |
| 2020/0276963 A1* | 9/2020 | Zimmermann | B60T 13/686 |
| 2021/0053540 A1* | 2/2021 | Besier | B60T 13/58 |
| 2022/0194344 A1* | 6/2022 | Tarandek | B60T 8/17 |

FOREIGN PATENT DOCUMENTS

| | | |
|---|---|---|
| DE | 10 2013 217 954 | 3/2015 |
| DE | 10 2013 224 783 | 6/2015 |
| DE | 10 2015 011 296 | 3/2017 |
| DE | 10 2017 214 187 | 2/2018 |
| EP | 1439104 | 7/2004 |
| KR | 10-1228492 | 1/2013 |
| KR | 20-0469006 | 9/2013 |
| KR | 10-1673772 | 11/2016 |
| WO | 2017/036569 | 3/2017 |

OTHER PUBLICATIONS

Written Opinion of the International Searching Authority for PCT/KR2020/003153 mailed on Jun. 22, 2020 (now published as WO 2020/180142).
Office Action for European Patent Application No. 20765526.7 issued on Oct. 10, 2022 (now published as EP3934949).
Extended European Search Report dated May 14, 2024 for European Patent Application No. 24150801.9.

* cited by examiner

[Figure 1]
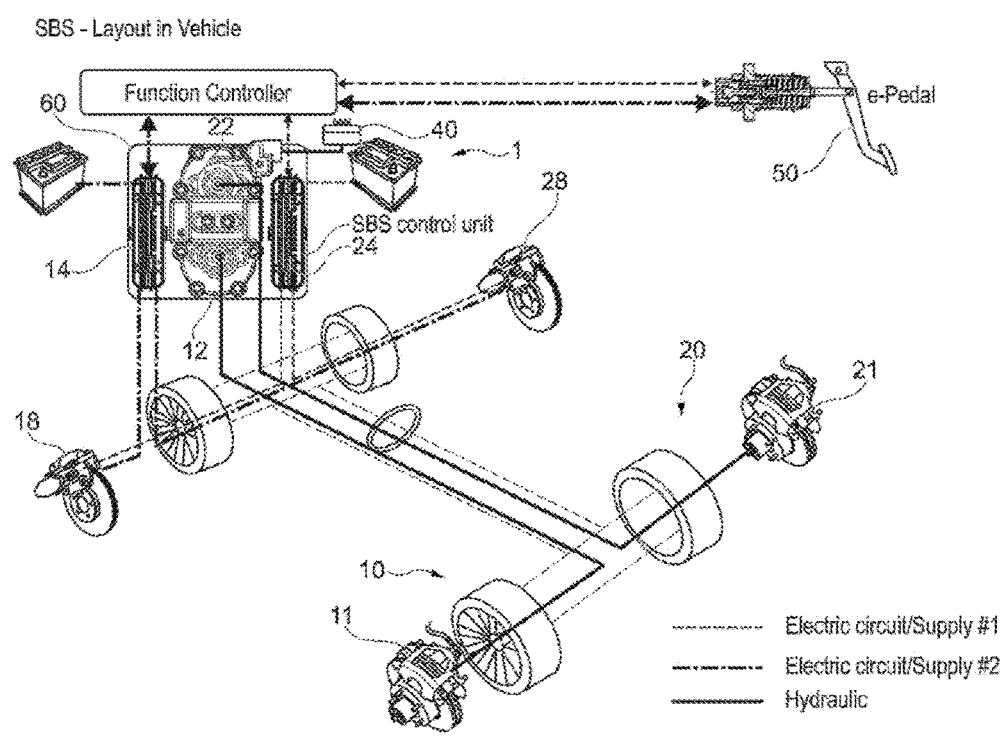

[Figure 2]
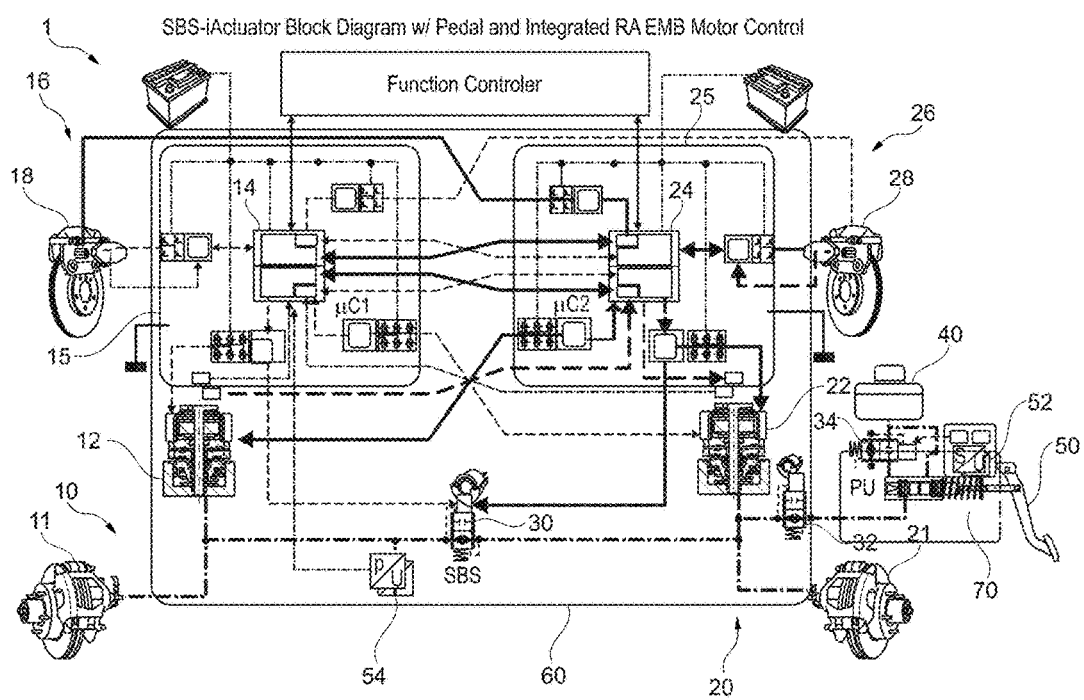

[Figure 3]
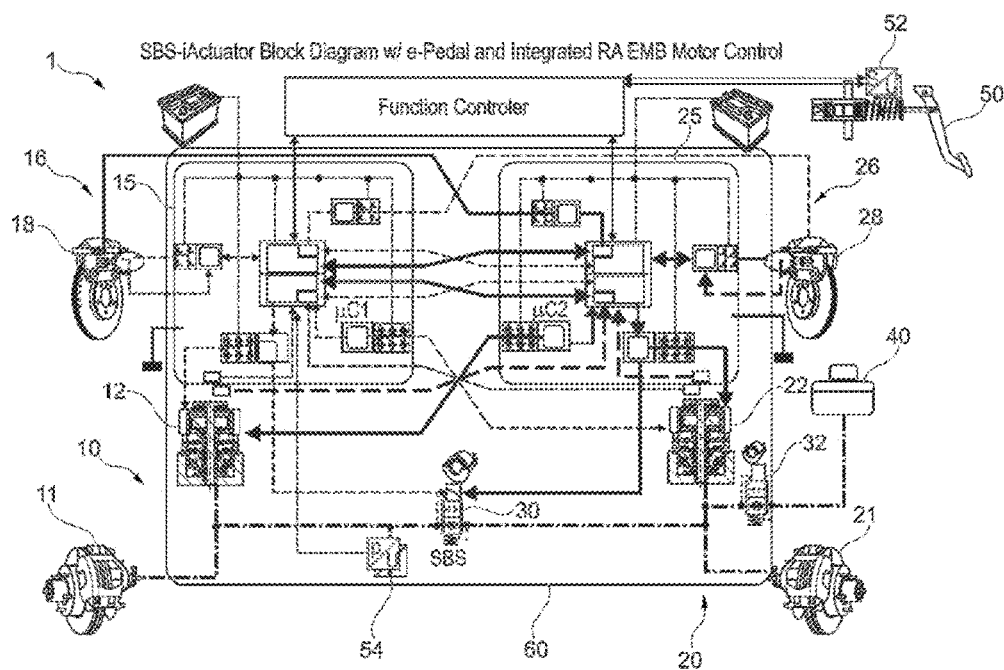

BRAKE SYSTEM

CROSS-REFERENCE TO RELATED APPLICATIONS

This application is the national stage of International Application No. PCT/KR2020/003153, filed on Mar. 6, 2020, which claims priority, under 35 U.S.C. 119 (a), to German Patent Application No. 102019203041.6 filed in Germany on Mar. 6, 2019, 2019, the disclosure of which is incorporated by reference herein in its entirety.

TECHNICAL FIELD

The present invention relates to a brake system. More particularly, the invention relates to a brake system comprising two hydraulic pressure suppliers each for pressurizing a hydraulic circuit depending on a brake request in a normal operating mode of the brake system.

BACKGROUND ART

The use of brake system comprising two hydraulic pressure suppliers each for pressurizing a hydraulic circuit depending on a brake request in a normal operating mode of the brake system is known from the prior art.

DISCLOSURE

Technical Problem

It is an object of the present invention to provide a brake system that is particularly silent.

It is a further object of the present invention to further increase safety of conventional brake systems.

It is a further object of the present invention to have a number of redundant components that take over or replace non-functioning components in case of emergency.

Technical Solution

The present invention has been made to solve at least one of the above-mentioned objects.

The invention is defined by the brake system of claim 1. Further developments and embodiments are described in the dependent claims and the following description.

The brake system for a vehicle may comprise a first hydraulic circuit including a first wheel brake, a second hydraulic circuit including a second wheel brake, a first hydraulic pressure supplier including an actuator for pressurizing the first hydraulic circuit in a normal operating mode, a second hydraulic pressure supplier including an actuator for pressurizing the second hydraulic circuit in the normal operating mode, a cut-off valve hydraulically connecting the first and second hydraulic circuits, a first control unit for controlling the cut-off valve and activating the first hydraulic pressure supplier and the second hydraulic pressure supplier depending on a brake request, and a second control unit for controlling the cut-off valve and activating the first hydraulic pressure supplier and the second hydraulic pressure supplier depending on a brake request, wherein the first control unit and/or second control unit are configured for keeping the cut-off valve closed in the normal operation mode and to open the cut-off valve in an emergency mode or in a pressure balancing mode, wherein the first hydraulic pressure supplier is hydraulically connected to both the first hydraulic circuit and the second hydraulic circuit for pressurizing said hydraulic circuits in the emergency mode or wherein the second hydraulic pressure supplier is hydraulically connected to both the first hydraulic circuit and the second hydraulic circuit for pressurizing said hydraulic circuits in the emergency mode.

Optionally, the cut-off valve hydraulically connects the first and second hydraulic circuits in the emergency mode or in the pressure balancing mode and hydraulically separates the first and second hydraulic circuits in the normal operating mode.

Optionally, the cut-off valve is a normally open valve.

Optionally, the cut-off valve is a solenoid valve.

Optionally, the first control unit and the second control unit are communicatively connected to each other.

Optionally, the first control unit and the second control unit have a symmetric design. For instance, the first control unit and the second control unit may have both the same structural and functional layout.

Optionally, the brake system further includes a first electromagnetic brake assembly including a third wheel brake and a second electromagnetic brake assembly including a fourth wheel brake, wherein the first control unit is configured to control the first electromagnetic brake assembly and the second electromagnetic brake assembly, wherein the second control unit is configured to control the first electromagnetic brake assembly and the second electromagnetic brake assembly.

Optionally, the brake system further includes a reservoir hydraulically connected to at least one of the first and second hydraulic circuits for storing a brake fluid, and a second cut-off valve arranged between the reservoir and at least one of the first and second brake circuits.

The second cut-off valve may be directly connected to the reservoir, e.g. via a fluid line. Alternatively, further hydraulic components are disposed between the second cut-off valve and the reservoir (see below).

The second cut-off valve may be electrically operated, e.g. by the first and the second control units. In some embodiments, the first and second control units are configured to close the second cut-off valve during a brake action and open the second cut-off valve in a rest condition.

Optionally, the second cut-off valve is a normally open valve and/or a solenoid valve.

In some cases, the second cut-off valve is hydraulically operated. For instance, the second cut-off valve may be closed by a hydraulic pressure in the first and/or second hydraulic circuits, e.g. during a brake action in the emergency mode or the normal operating mode. The second cut-off valve may be opened if the pressure in the first and/or second hydraulic circuits falls below a predetermine value, e.g. in the pressure-balancing mode or in the rest condition.

Optionally, the brake system further includes a brake pedal, and a brake pedal sensor for detecting an operation of the brake pedal, wherein the first control unit and the second control unit are connected to the brake pedal sensor and are configured to control the cut-off valve and activate the first and second hydraulic pressure suppliers depending on sensor signals of the brake pedal sensor.

Optionally, the brake system further comprises a master cylinder arrangement coupled to the brake pedal for providing a pedal feel in a normal operating mode or an emergency mode and/or providing a hydraulic fall-back mode. The hydraulic fall-back mode may be established in case both the first hydraulic pressure supplier and the second hydraulic pressure supplier are inoperable or have a malfunction.

Optionally, the cut-off valve hydraulically connects the first and second hydraulic circuits in the hydraulic fall-back mode.

The master cylinder arrangement may be arranged between the second cut-off valve and the reservoir. The second cut-off valve may be opened or kept open in the hydraulic fall-back mode. The second cut-off valve may hydraulically separate the master cylinder arrangement and the hydraulic circuits in the normal operation mode and/or the emergency mode. A third cut-off valve may be arranged between the reservoir and the master cylinder arrangement. The third cut-off valve may be a normally closed valve. The third cut-off valve may be electrically operated. In some examples, the third cut-off valve is a solenoid valve.

Advantageous Effects

The brake system according to the various embodiments of the present invention may provide a brake system that is particularly silent and increase safety of conventional brake systems and have a number of redundant components that take over or replace non-functioning components in case of emergency.

DESCRIPTION OF DRAWINGS

Various objects and advantages of the present invention will become apparent to those skilled in the art from the following detailed description of embodiments, when read in light of the accompanying drawings.

FIG. 1 shows a schematic diagram of a brake system for a vehicle;

FIG. 2 shows further schematic diagram of the brake system shown in FIG. 1; and

FIG. 3 shows a schematic diagram of an alternative brake system.

BEST MODE

In the following, recurring and similar features in this and in the subsequent representations are provided with the same reference numerals.

In the following, reference is made to FIGS. 1-3. FIGS. 1-3 illustrate a brake system 1 for a vehicle, comprising a first hydraulic circuit 10 including a first wheel brake 11 and a second hydraulic circuit 20 including a second wheel brake 21. The brake system 1 may further comprise a first hydraulic pressure supplier 12 including an actuator for pressurizing the first hydraulic circuit 10 in a normal operating mode, a second hydraulic pressure supplier 22 including an actuator for pressurizing the second hydraulic circuit 20 in the normal operating mode, and a cut-off valve 30 hydraulically connecting the first and second hydraulic circuits 10, 20. Thus, the first wheel brake 11 and the second wheel brake 11 are hydraulically operated wheel brakes.

The cut-off valve 30 may hydraulically connect the first and second hydraulic circuits 10, 20 in an emergency mode or in a pressure balancing mode or in a hydraulic fall-back mode. The cut-off valve 30 may be further configured to hydraulically separate the first and second hydraulic circuits 10, 20 in a normal operating mode, in particular during a braking action. Optionally, the cut-off valve 30 may be a normally open valve. Furthermore, the cut-off valve 30 may be electrically operated, e.g. a solenoid valve.

The brake system 1 may further include a first control unit 14 for controlling the cut-off valve 30 and activating the first hydraulic pressure supplier 12 and the second hydraulic pressure supplier 22 depending on a brake request, and a second control unit 24 for controlling the cut-off valve 30 and activating the first hydraulic pressure supplier 12 and the second hydraulic pressure supplier 22 depending on a brake request. The first control unit 14 may be operatively and/or communicatively coupled to the first hydraulic pressure supplier 12 and the second hydraulic pressure supplier 22. Moreover, the second control unit 24 may be operatively and/or communicatively coupled to the first hydraulic pressure supplier 12 and the second hydraulic pressure supplier 22.

In the present disclosure, communicatively coupled may mean that signals, data and/or messages can be sent, e.g. exchanged, from one device to the other one, preferably bidirectionally. Preferably, the brake system 1 may comprise several redundant communication channels to receive, transmit or exchange redundant signals, data and/or messages.

The first control unit 14 and/or second control unit 24 are preferably configured for keeping the cut-off valve 30 closed in the normal operation mode. Furthermore, the control units 14, 24 may be configured to open the cut-off valve 30 in the emergency mode or in the pressure balancing mode or in the hydraulic fall-back mode.

Furthermore, the first hydraulic pressure supplier 12 is hydraulically connected to both the first hydraulic circuit 10 and the second hydraulic circuit 20 for pressurizing said hydraulic circuits in the emergency mode. Alternatively, the second hydraulic pressure supplier 22 is hydraulically connected to both the first hydraulic circuit 10 and the second hydraulic circuit 20 for pressurizing said hydraulic circuits 10, 20 in the emergency mode.

The emergency mode may be used as a back-up mode, for instance when there is a power failure in one of the components described above or when one of the first and second hydraulic pressure suppliers 12, 22 does not function properly. This may be detected by at least one or more dedicated sensors (not shown). For instance, at least one pressure sensor may be envisaged for measuring pressure at least one of the hydraulic circuits 10, 20 and/or at the hydraulic pressure suppliers 12, 22. An exemplary pressure sensor 54 is depicted in FIGS. 1 and 2. Other sensors that can detect a malfunction of the hydraulic pressure supplier 12, 22 may also be envisaged. In the pressure balancing mode, the cut-off valve 30 is typically opened or kept open. In this way, the pressures in the hydraulic circuits 10, 20 may be balanced to keep the hydraulic pressure in the brake system 1 constant and to avoid large pressure differences in hydraulic circuits 10, 20. The pressure may be balanced when the brake system 1 is in a rest position/rest condition, i.e. during non-braking. That is, the brake system 1 may be in the pressure balancing mode as long as a braking action is not requested or required. In the pressure balancing mode, at least one of the hydraulic circuits 10, 20 or both may be hydraulically connected to a reservoir 40 containing brake fluid. If a bracing action is requested in the normal operating mode, the cut-off valve 30 is closed. This enables independent control of the wheel brakes 11, 21 by the two separate hydraulic pressure suppliers 12, 22. In contrast, when a braking action is requested in the emergency mode, the cut-off valve 30 may be opened or kept open. Thus, in the emergency mode only one of the hydraulic pressure suppliers 12, 22 pressurizes both hydraulic circuits 10, 20.

Thus, if one of the first and second hydraulic pressure suppliers 10, 20 has a failure, the other one can take over its pressure supply function and provide pressure to both hydraulic circuits 10, 20.

Moreover, each of the hydraulic pressure suppliers 12, 22 is controlled by two independent control units 14, 24. Thus, in case of a malfunction of one of the control units 14, 24, the other one may take over its controlling functions.

Due to the duplicated control units 14, 24 and the doubled hydraulic pressure suppliers 12, 22 the brake system 1 has a plurality of redundant components, which improves the overall safety of the brake system 1. Moreover, the doubled hydraulic pressure suppliers 12, 22 enable independent control of the wheel brakes 11, 21. Further, as only two (FIG. 2) or only three (FIG. 3) valves may be used, any noise produced by valves in the brake system 1 can be kept at a low level.

The control units 14, 24 may each include printed circuit boards 15, 25, on which respective microcontrollers and/or microprocessors are mounted. Further, the control units 14, 24 and the first and second hydraulic pressure suppliers 10, 20 may be fixed on a joined support structure 60 or housed in a common housing. In some embodiments, the first control unit 14 and the second control unit 24 are communicatively connected to each other, see FIGS. 2 and 3. Thus, the first control unit 14, 24 may exchange signals, data, such as sensor data, messages, control signals or the like.

The first control unit 14 and the second control unit 24 may have a symmetric design, both structurally and functionally. Stated otherwise, the control units 14, 24 have the same configuration. The only difference between the first control unit 14 and the second control unit 24 may be that the first control unit 14 is connected to a pressure sensor 54 for measuring a pressure in at least the first hydraulic circuit 10. However, in some embodiments a further pressure sensor (not shown) may be connected to the second control unit for measuring a pressure in at least the second hydraulic circuit 20. Optionally, each control unit 14, 24 may be connected to both pressure sensors.

As shown in FIGS. 1-3, the brake system 1 may further comprise a first electromagnetic brake assembly 16 including a third wheel brake 18 and a second electromagnetic brake assembly 26 including a fourth wheel brake 28. The wheel brakes 18, 28 may be used for regenerative braking.

The first control unit 14 may be configured to control the first electromagnetic brake assembly 16 and the second electromagnetic brake assembly 26. Furthermore, the second control unit 24 may be configured to control the first electromagnetic brake assembly 16 and the second electromagnetic brake assembly 26.

The first control unit 14 and the second control unit 24 may form a master-slave system. For instance, in case both control units 14, 24 work properly, one of the first and second control units 14, 24 may control the other one. As indicated in FIGS. 2, 3, each of the control units 14, 24 may be connected to its own power supply, such as a battery. Both control units 14, 24 can be operatively connected to a central ECU, which is indicated in FIGS. 2 and 3 as "Function Controller".

At least one of the first control unit 14 and the second control unit 24 may take over the functions of the other one of the control units if it is detected that the other control unit has a malfunction and/or in case of a power failure. The hydraulic pressure suppliers 12, 22 may be activated when they receive at least one control signal, i.e. a control signal from the first control unit 14 and/or second control unit 24. Similarly, the valves 30, 32, 34, and/or the electromagnetic brakes 18, 28 may be operated/activated/controlled when they receive at least one corresponding signal, i.e. a signal from the first control unit 14 and/or the second control unit 24.

The brake system 1 may further comprise a reservoir 40 hydraulically connected to at least one of the first and second hydraulic circuits 10, 20 for storing a brake fluid, and a second cut-off valve 32 arranged between the reservoir 40 and at least one of the first and second brake circuits 10, 20. In the embodiments shown, the second cut-off valve 32 hydraulically connects the reservoir 40 and the second brake circuit 20.

The first and second control units 14, 24 may be configured to close the second cut-off valve 32 during a brake action and open the second cut-off valve 32 in a rest condition. For instance, the second cut-off valve 32 may be opened in the pressure balancing mode. Optionally, the second cut-off valve 32 is a normally open valve. Typically, the second cut-off valve 32 is a solenoid valve.

The brake system 1 may further comprise a brake pedal 50, and a brake pedal sensor 52 for detecting an operation of the brake pedal 50. The first control unit 14 and the second control unit 24 may be connected to the brake pedal sensor 52 and may be configured to control the cut-off valve 30 and activate the first and second hydraulic pressure suppliers 12, 22 depending on sensor signals of the brake pedal sensor 52. Thus, the brake system 1 is a "brake-by-wire" brake system.

In some instances, the vehicle is an autonomous vehicle, i.e. the vehicle does not need human intervention to function. In these instances, the brake pedal and its associated features can be omitted.

In FIGS. 2 and 3, the first control unit 14 may include a microcontroller μC1 while the second control unit 24 can include a microcontroller μC2. Furthermore, the following abbreviations are used in the drawings: RA—rear axle; EMB—electromagnetic braking (or electromechanical braking); e-Pedal—electronic pedal; SBS—semidry brake system (referring to the dry EMB brakes at the rear wheels and the "wet" hydraulic brakes at the front wheels).

The difference between the brake systems of FIG. 2 and FIG. 3 is that the brake system 1 of FIG. 2 comprises a master cylinder arrangement 70 which is coupled to the brake pedal 50. Such a master cylinder arrangement 70 is known from conventional brake systems; therefore, an exhaustive description thereof is omitted in the present disclosure. The master cylinder arrangement 70 usually comprises a piston rod that mechanically couples the brake pedal 50 and at least one piston arranged within a housing of the master cylinder arrangement 70. The master cylinder arrangement 70 typically operates the hydraulic wheel brakes 11, 21 in a hydraulic fall-back mode e.g. in a power failure of the brake system 1 or in case none of the hydraulic pressure suppliers 12, 22 works properly and/or both the control units 14, 24 malfunction. Thus, the master cylinder arrangement 70 may pressurize the first and second hydraulic circuits 10, 20 in the hydraulic fall-back mode and thus provides a hydraulic brake force to the wheel brakes 11, 21. The master cylinder arrangement 70 provides a further redundant component that further increases the safety of the brake system 1. The master cylinder arrangement 70 may also provide a simulation of the brake pedal 50 (pedal feel) in the normal operating mode and/or the emergency mode. This functionality may be performed by a simulation unit which may be an integrated part of the master cylinder arrangement 70 or a separate part.

In some cases, the master cylinder arrangement 70 is arranged between the second cut-off valve 32 and the reservoir 40. Typically, the second cut-off valve 32 hydraulically connects the master cylinder arrangement 70 with the first and/or second hydraulic circuits 10, 20. The second cut-off valve 32 may be opened or kept open in the hydraulic fall-back mode.

A third cut-off valve 34 may be arranged between the reservoir 40 and the master cylinder arrangement 70 and may hydraulically connect the reservoir 40 and the master cylinder arrangement 70. The third cut-off valve may be a normally closed valve. The third cut-off valve 34 may be electrically operated and controlled by the first and/or second control units 14, 24. In some examples, the third cut-off valve 34 is a solenoid valve. The third cut-off valve 34 may be opened or kept open in the pressure balancing mode and/or in the rest condition (i.e. in absence of a brake request).

In some cases, e.g. according to an implantation form of the embodiment shown in FIG. 3, the second cut-off valve 32 can be hydraulically operated instead of electrically operated. For instance, the second cut-off valve 32 may be closed by a hydraulic pressure in the first and/or second hydraulic circuits 10, 20, e.g. during a brake action in the emergency mode or the normal operating mode. The second cut-off valve 32 may be opened if the pressure in the first and/or second hydraulic circuits 10, 20 falls below a predetermine value, e.g. in the pressure-balancing mode or in the rest condition.

The normal operating mode may also be denoted as fully powered braking mode.

Even though the first wheel brakes 11 and second wheel brakes 12 are located at the front wheels in FIGS. 1-3, in alternative embodiments they may be located at the rear wheels of the vehicle. Thus, the hydraulic wheel brakes 11, 12 can be both provided at either the front axle or the rear axle. The electro-magnetic wheel brakes 18, 28 can be both provided at the respective other axle, i.e. the rear axle or the front axle. The brake system 1 may further comprise an electric park brake.

In some embodiments, the first hydraulic circuit 10 includes two hydraulic wheel brakes that are provided at one of the front axle and rear axle and/or the second hydraulic circuit 20 includes two hydraulic wheel brakes arranged at the other one of the front axle and the rear axle. In this case, the electro-magnetic wheel brakes 18, 28 for regenerative braking can be omitted.

In the following, operation of the brake system 1 shown in FIGS. 2 and 3 is described.

Upon a brake request the first control unit 14 and/or the second control unit 24 are configured to activate the first hydraulic pressure supplier 12 and the second hydraulic pressure 22 supplier e.g. by sending a control signal to the corresponding hydraulic pressure supplier 12, 22. Then, the corresponding hydraulic pressure supplier 12, 22 pressurizes at least one of the hydraulic circuits 10, 20 depending on the operating mode of the brake system.

In the normal operating mode, each of the first and second control units 14, 24 sends a signal to close the cut-off valve 30 thereby hydraulically separating hydraulic circuits 10, 20. Thus, the first hydraulic pressure supplier 12 solely pressurizes the first hydraulic circuit 10 and the second hydraulic pressure supplier 22 solely pressurizes the second hydraulic circuit 20. In the emergency mode only one of the first and second hydraulic pressure suppliers 12, 22 pressurizes both hydraulic circuits 10, 20. The emergency mode can be established in case of a malfunction of one of the first and second hydraulic pressure suppliers 12, 22. In the hydraulic fall-back mode none of the first and second pressure suppliers 12, 22 pressurizes the hydraulic circuits 10, 20. Instead, this is performed by the master cylinder arrangement 70.

The first and second control units 14, 24 are configured to control the cut-off valve 30 and/or the second cut-off valve 32 and/or the hydraulic pressure suppliers 12, 22 based on a status of the first and second hydraulic pressure suppliers 12, 22. The status may comprise "inoperable" (malfunction, defect) or "operable" (functioning, functional). If the status of one of the first and second pressure suppliers 12, 22 is inoperable, the emergency mode is activated. If the status of both pressure suppliers 12, 22 is operable, then the normal operating mode or the pressure balancing mode is activated. If the status of both pressure suppliers 12, 22 is inoperable, the hydraulic fall-back mode can be activated in the embodiment shown in FIG. 2.

The status of the hydraulic pressure suppliers 12, 22 may be determined by sending, by the first and/or second control units 14, 24, a query to the corresponding hydraulic pressure supplier 12, 22. The corresponding hydraulic pressure supplier 12, 22 may send a response message or signal to the first and second control units 14, 24 indicating its status. For instance, each of the first and second hydraulic pressure suppliers 12, 22 may be configured to perform a self-test to determine its status. Optionally, if the first and second control units 14, 24 do not receive the response message within a predetermined period of time this may be an indication that the corresponding hydraulic pressure supplier 12, 22 is inoperable. Alternatively or additionally, the status of the hydraulic pressure suppliers 12, 22 may be determined by measuring the pressure supplied by the corresponding hydraulic pressure supplier 12, 22, e.g. by pressure sensor 54.

Any features shown in FIGS. 1 and 2 may be combined with each other or may be separately claimed. Any features shown in FIGS. 1 and 3 may be combined with each other or may be separately claimed.

REFERENCE NUMERALS 1 brake system
10 first hydraulic circuit
11 first wheel brake
12 first hydraulic pressure supplier
14 first control unit
15 first printed circuit board
16 first electromagnetic brake assembly
18 third wheel brake
20 second hydraulic circuit
21 second wheel brake
22 second hydraulic pressure supplier
24 second control unit
25 second printed circuit board
26 second electromagnetic brake assembly
28 fourth wheel brake
30 cut-off valve
32 second cut-off valve
34 third cut-off valve
40 reservoir
50 brake pedal
52 brake pedal sensor
54 pressure sensor
60 support structure
70 master cylinder arrangement

The invention claimed is:
1. A brake system for a vehicle, comprising:
a first hydraulic circuit including a first wheel brake, a second hydraulic circuit including a second wheel brake,
a first hydraulic pressure supplier including an actuator configured to pressurize the first hydraulic circuit in a normal operating mode,
a second hydraulic pressure supplier including an actuator configured to pressurize the second hydraulic circuit in the normal operating mode,
a cut-off valve hydraulically connecting the first and second hydraulic circuits,
a first controller configured to control the cut-off valve and activate the first hydraulic pressure supplier and the second hydraulic pressure supplier depending on a brake request, and
a second controller configured to control the cut-off valve and activate the first hydraulic pressure supplier and the second hydraulic pressure supplier depending on a brake request,
wherein the first controller and/or second controller are configured to keep the cut-off valve closed in the normal operation mode and to open the cut-off valve in an emergency mode or in a pressure balancing mode,
wherein the first hydraulic pressure supplier is hydraulically connected to both the first hydraulic circuit and the second hydraulic circuit for pressurizing said hydraulic circuits in the emergency mode or
wherein the second hydraulic pressure supplier is hydraulically connected to both the first hydraulic circuit and the second hydraulic circuit for pressurizing said hydraulic circuits in the emergency mode,
wherein:
the first controller is directly electrically connected to the first hydraulic pressure supplier and the second hydraulic pressure supplier to directly control the first hydraulic pressure supplier and the second hydraulic pressure supplier, and
the second controller is directly electrically connected to the first hydraulic pressure supplier and the second hydraulic pressure supplier to directly control the first hydraulic pressure supplier and the second hydraulic pressure supplier.

2. The brake system according to claim 1, further comprising
a brake pedal, and
a brake pedal sensor for detecting an operation of the brake pedal (50),
wherein the first controller and the second controller are connected to the brake pedal sensor and are configured to control the cut-off valve and activate the first and second hydraulic pressure suppliers depending on sensor signals of the brake pedal sensor.

3. The brake system according to claim 2, further comprising a master cylinder arrangement coupled to the brake pedal for providing a pedal feel in a normal operating mode or the emergency mode and/or providing a hydraulic fallback mode.

4. The brake system according to claim 2, where in the emergency mode only one of the first and second hydraulic pressure suppliers pressurizes both hydraulic circuits.

5. The brake system according to claim 2, wherein the first controller and the second controller are communicatively connected to each other.

6. The brake system according to claim 2, further including a first electromagnetic brake assembly including a third wheel brake land a second electromagnetic brake assembly including a fourth wheel brake,
wherein the first controller is configured to control the first electromagnetic brake assembly and the second electromagnetic brake assembly,
wherein the second controller is configured to control the first electromagnetic brake assembly and the second electromagnetic brake assembly.

7. The brake system according to claim 1, wherein the cut-off valve is a normally open valve and/or wherein the cut-off valve is a solenoid valve.

8. The brake system according to claim 7, further comprising
a reservoir hydraulically connected to at least one of the first and second hydraulic circuits for storing a brake fluid, and
a second cut-off valve arranged between the reservoir and at least one of the first and second brake circuits,
wherein the first and second controllers are configured to close the second cut-off valve during a brake action and open the second cut-off valve in a rest condition.

9. The brake system according to claim 8, wherein the second cut-off valve is a normally open valve and/or a solenoid valve.

10. The brake system according to claim 1, further comprising
a reservoir hydraulically connected to at least one of the first and second hydraulic circuits for storing a brake fluid, and
a second cut-off valve arranged between the reservoir and at least one of the first and second brake circuits,
wherein the first and second controllers are configured to close the second cut-off valve during a brake action and open the second cut-off valve in a rest condition.

11. The brake system according to claim 10, wherein the second cut-off valve is a normally open valve and/or a solenoid valve.

12. The brake system according to claim 1, where in the emergency mode only one of the first and second hydraulic pressure suppliers pressurizes both hydraulic circuits.

13. The brake system according to claim 1, wherein the first controller and the second controller are communicatively connected to each other.

14. The brake system according to claim 1, wherein the first controller and the second controller have a symmetric design.

15. The brake system according to claim 1, further including a first electromagnetic brake assembly including a third wheel brake land a second electromagnetic brake assembly including a fourth wheel brake,
wherein the first controller is configured to control the first electromagnetic brake assembly and the second electromagnetic brake assembly,
wherein the second controller is configured to control the first electromagnetic brake assembly and the second electromagnetic brake assembly.

* * * * *